United States Patent

Prey

[11] Patent Number: 5,900,680
[45] Date of Patent: * May 4, 1999

[54] CIRCUIT ARRANGEMENT FOR SUPPLYING AN OPERATING VOLTAGE FROM AN OPERATING VOLTAGE SOURCE TO A PLURALITY OF CONNECTABLE AND DETACHABLE CIRCUIT UNITS

[75] Inventor: Gerhard Prey, Eichenau, Germany

[73] Assignee: Siemens Aktiengesellschaft, Munich, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/807,667

[22] Filed: Feb. 27, 1997

[30] Foreign Application Priority Data

Feb. 27, 1996 [DE] Germany ................... 19607359

[51] Int. Cl.$^6$ ....................................................... H02J 3/00
[52] U.S. Cl. ...................... 307/30; 307/31; 307/38; 395/282; 395/283

[58] Field of Search ................... 307/31, 30, 38, 307/139; 395/283, 282; 379/24

[56] References Cited

U.S. PATENT DOCUMENTS

| | | |
|---|---|---|
| 4,785,149 | 11/1988 | Gilliland ............................ 219/130.21 |
| 5,222,119 | 6/1993 | Asano ........................................ 379/24 |
| 5,237,207 | 8/1993 | Kwiatkowski et al. .................. 307/31 |
| 5,281,859 | 1/1994 | Crane ....................................... 307/139 |

*Primary Examiner*—Albert W. Paladini
*Attorney, Agent, or Firm*—Hill & Simpson

[57] ABSTRACT

A circuit arrangement that controls the increase in voltage output of an operating voltage source such that a voltage dip during connection (or reconnection after repair) of a pluggable unit remains higher than the minimum allowable value and controls the decrease in voltage output to a normal operating voltage after a predetermined time interval. The increase can occur manually by a switch or automatically thru the use of sensors.

15 Claims, 1 Drawing Sheet

CIRCUIT ARRANGEMENT FOR SUPPLYING AN OPERATING VOLTAGE FROM AN OPERATING VOLTAGE SOURCE TO A PLURALITY OF CONNECTABLE AND DETACHABLE CIRCUIT UNITS

BACKGROUND OF THE INVENTION

The invention relates to a circuit arrangement for supplying an operating voltage to a number of connectable and detachable circuit units from an operating voltage source.

Connectable and detachable circuit units include circuits such as subscriber terminal circuits or groups of subscriber terminal circuits as used in telephone switching exchanges. Generally, a common voltage transformer supplies an operating voltage of approximately 5 volts to the circuit units.

In applications involving circuit units there is a need to exchange an older unit with a newer unit or connect additional units without disturbing the operation of the other existing units. Such additional connections are difficult, because the units also contain capacitors. The capacitors need to be charged. Therefore in the first moment of the connection, an increased load of the operating voltage occurs due to charging processes of the capacitors. In situations where the current efficiency of the voltage transformer is limited, the supply lines to the voltage transformers are not generally low-resistance, and a rapid compensation of the current surge cannot be carried out problem free, thus a dip in the operating voltage is expected. At a supply voltage of 5 V, a typical voltage dip lies in the range from 0.3 to 0.7 V, and the time duration lies in the microsecond ($\mu$s) range.

Switching circuits used in the subscriber terminal circuits operate securely only in the range from 4.5 to 5.5 V. In this voltage range disturbances in the operation of the circuit units often occurs. A possible solution to this problem is to provide the circuit units with what is called a leading contact pin. A special voltage is applied to the leading contact during the connection and before the actual operating voltage is applied. The special voltage charges the capacitors of the unit in a delayed fashion. The special voltage is derived from the normal operating voltage and is supplied via a centrally provided inductor to the charge pulse.

In the unit itself, a diode decouples the mentioned special voltage from the standard operating voltage. This solution is undesirable because of the high costs associated with the special contacts, the central coil and the decoupling diodes.

If a decoupling diode is defective, i.e. it is short-circuited or interrupted, the operation of the circuit is adversely affected. Even in units that are not sensitive to the voltage dips, but cause such voltage dips, it is not possible to forego the mentioned individual measures if overall a combination of units existing in the system that are sensitive to operating voltage dips.

SUMMARY OF THE INVENTION

An object of the invention is to provide a circuit arrangement in which a switching means activates a common operating voltage source to temporarily supply an operating voltage to all the circuit units. The operating voltage is increased for a time interval in relation to the normal value provided for the addition of circuit units to the system or the exchange in circuit units. During a dip in the operating voltage due to the charging of the capacitors within the added units, the operating voltage maintains a value that ensures proper operation of all the units.

Another object of the invention is to omit individual switching measures, such as leading contact pins and decoupling diodes.

A further object of the invention is to efficiently reduce the current necessary in a circuit arrangement due to the increased operating voltage from the outset and over the entire duration of operation.

A further object of the invention is to provide a circuit arrangement where the increase in the operating voltage can be initiated manually by using a switch, or automatically by sensing the motion of the unit into its final position as it is newly connected to the source of the operating voltage, which causes the increased operating voltage.

A further object of the invention is to provide construct a circuit arrangement where the respective degree of the increase in the operating voltage is made dependent on the total number of units supplied by the operating voltage so that as the number of units connected to the voltage source increases, the connection of an additional unit has less influence on the overall system.

A further object of the invention is to reduce power loss from an operating state in which no unit is connected to the power supply by lowering the operating voltage in relation to the normal voltage value.

In the following, the invention is explained in more detail on the basis of an exemplary embodiment with reference to the drawings.

DETAILED DESCRIPTION OF THE PREFERRED EMBODIMENTS

Figure 1:
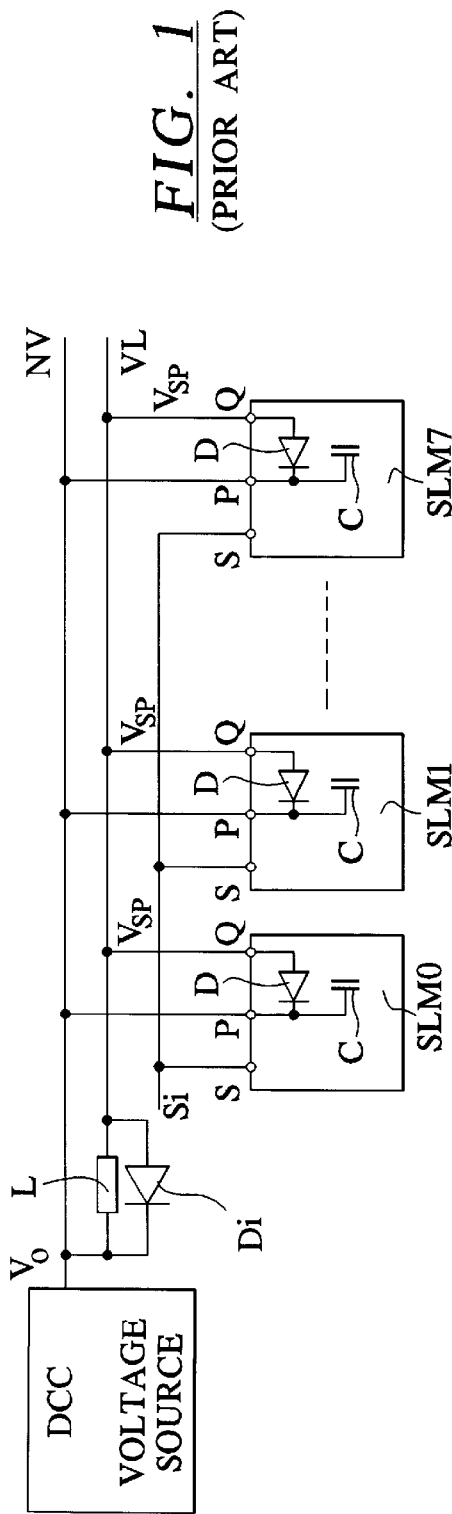
FIG. 1 is a schematic block diagram of a known circuit arrangement.

As shown in FIG. 1, an operating voltage source DCC commonly supplies an operating voltage $V_O$ to a plurality of connectable and detachable circuit units SLM0 to SLM7. The circuit units SLM0 to SLM7, which may for example be subscriber terminal circuits of a telephone switching system, are connected to an output of the operating voltage source DCC via terminal contacts P and a supply line NV. A normal supply voltage, which may be 5 V, is supplied via the supply line NV.

Signaling information is transmitted to the circuit units via a line Si and terminal contacts S. The contacts P are, if necessary, leading to provide appropriate voltage in relation to the contacts S, in order to ensure that a signaling operation occurs only if the operating voltage $V_O$ is properly applied.

During the connecting of new circuit units or during the reconnecting after an exchange in circuit units, a special operating voltage $V_{SP}$ with an increased value, for charging capacitors C is supplied via contacts Q, which are leading contacts in relation to the contacts P, and via an additional supply line VL by the operating voltage source DCC.

FIG. 1 also shows, as a component of the circuit units SLM0 to SLM7, diodes D for decoupling the special voltage $V_{SP}$ from the actual normal supply voltage V.

In the additional supply line VL, a switching means is provided by an inductor L that is arranged in a central position and bridged by a diode Di. This switching means is supposed to provide an increase in voltage so that the charge surge during the contacting of the leading contacts Q remains relatively small.

Figure 2:
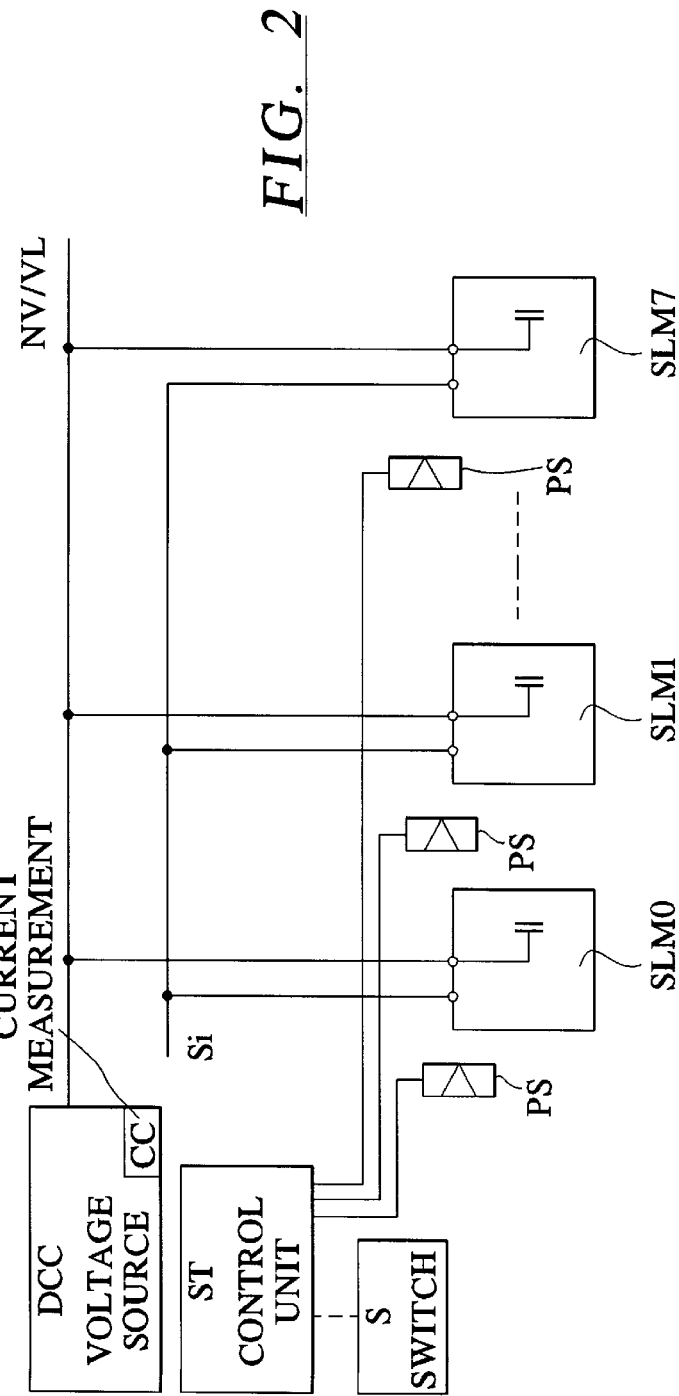
FIG. 2 is a schematic block diagram of the circuit arrangement according to the invention.

FIG. 2 shows a circuit arrangement according to the invention in which the additional supply line VL with the inserted inductance L and the leading contact pins Q of the known circuit arrangement in FIG. 1 are omitted. In this circuit arrangement a control unit ST is connected to the voltage supply source DCC. When an additional circuit unit is connected to the voltage source or a unit is reconnected to the voltage source after an exchange from an older circuit unit to a newer circuit unit, the control unit ST ensures that the operating voltage source DCC supplies an increased operating voltage of approximately 5.3 V to the units SLM0 to SLM7 via the supply line NV/VL, instead of the normal operating voltage of 5 V. This increased voltage $V_O$ is low enough to be handled by the components within the circuit units SLM0 to SLM7, and yet above the normal operating voltage so that the voltage dip (e.g. 4.6 V), which occurs when the units are connected to the voltage source in order to charge the capacitors contained therein, does not lead to a dip in the operating voltage that causes an adverse effect on the operation of the units. The transition from the normal operating voltage to the increased operating voltage $V_O$ is a slow one so that the circuit units which are already in operation are not disturbed.

Additionally the control unit ST ensures that the operating voltage $V_O$ gradually returns to the normal voltage value after a predetermined time period which is sufficient to carry out either the connection process or the detachment process.

According to the design of the invention, the degree in which the operating voltage increases is preferably made dependent on the number of units SLM0 to SLM7 already connected. The increase in operating voltage is smaller when more units are already connected to the operating voltage source DCC. During connection of a very first circuit unit SLM0, the increase in operating voltage is almost negligible (or even nonexistent).

The control unit ST derives the required degree of increase in the operating voltage $V_O$ from the current value of current consumption at the voltage source DCC.

A manual switch S is used to activate the increased operating voltage output. However, in an alternative embodiment, the control unit ST can also sense the motion of units to be connected into their final position automatically by using sensors, such as photosensors PS. In this embodiment, the increase in operating voltage is triggered by the corresponding sensor signal.

Another possibility is to make the triggering of the increase in operating voltage dependent on the plugging in of a grounding strip (not shown). In order to avoid static discharges while an operator is working on a module, work guidelines require a grounding strip be used to connect the operator with a grounding frame. If such a connection is omitted during the plugging in of a module, a voltage dip will result in the named variant, and a voltage monitor (which is present in any case)will operate to reset the already-plugged modules. In this way, the named variant of the invention additionally serves for the monitoring of the proper behavior of the operating personnel.

In an operating state in which no unit is yet connected, it can be useful to lower the operating voltage below the normal operating value. The lowered operating voltage however still lies far enough above the allowable minimum value so that this minimum value is not reached during other voltage fluctuations, i.e. fluctuations not associated with the connection of units. As a result, the power loss can be reduced.

Although the present invention has been described with reference to a specific embodiment, those of skill in the art will recognize that changes may be made thereto without departing from the scope and spirit of the invention as set forth in the appended claims.

What is claimed is:

1. A circuit arrangement for supplying an operating voltage from an output of an operating voltage source to a plurality of connectable and detachable circuit units, each of the plurality of connectable and detachable circuit units having a capacitance which requires charging upon connection of said circuit unit to said output of said operating voltage source, the circuit arrangement comprising:

a control unit to temporarily increase the operating voltage at the output of the operating voltage source such that the operating voltage does not fall below a minimum voltage level during charging of the capacitance upon connection of an additional one of said circuit units having the capacitance, and said control unit decreasing the operating voltage at the output of the operating voltage source to a normal operating voltage value after a predetermined time interval from the temporary increase, the control unit being connected to an input of the operating voltage source to cause said increase; and a switch connected to said control unit to indicate an imminent connection of the additional circuit unit to the operating voltage source;

said predetermined time interval being at least as long as a time for substantially charging said capacitance of said additional circuit unit.

2. The circuit arrangement in claim 1, wherein the switch is a manual switch.

3. The circuit arrangement in claim 1, wherein the switch is a sensor.

4. The circuit arrangement according to claim 1, wherein the switch is a grounding strip having a first end and a second end, the first end connected to an operator and the second end connected to a ground frame containing the plurality of circuit units.

5. A circuit arrangement, comprising:

an operating voltage source having an input and an output, the output providing an operating voltage for a plurality of circuit units, the input causing an increase in said operating voltage upon receipt of an input signal;

a plurality of alternatively connectable and detachable circuit units, each of said circuit units having a capacitance and being selectively connectable to the output of the operating voltage source via a supply line so that said circuit units receive the operating voltage, said capacitance requiring charging upon connection of said circuit units to the operating voltage;

a control unit having an input and an output, the output of the control unit connected to the input of the operating voltage source to provide said input signal to said input of said operating voltage source for a predetermined time; and a trigger connected to said input of said control unit, said trigger triggering said control unit to provide said input signal to said input of said operating voltage source upon connection of at least one of said plurality of alternatively connectable and detachable circuit units to said operating voltage source so that said operating voltage does not drop below a minimum level during charging of said capacitance.

6. The circuit arrangement according to claim 5, wherein the means for triggering an increase in operating voltage is a manual switch.

7. The circuit arrangement according to claim 5, wherein the means for triggering an increase in operating voltage is a sensor.

8. A method for supplying an operating voltage from a voltage source to a circuit including a connectable circuit unit having a capacitance, the method comprises:

triggering a temporary increase in an output voltage from the voltage source above a normal level for connection of an additional connectable circuit unit having a capacitance to said operating voltage source so that the output voltage from the voltage source stays above a predetermined level during charging of said capacitance of said additional connectable circuit unit;

connecting said additional connectable circuit unit to said voltage source during said increase in output voltage; and decreasing the output voltage from the voltage source to said normal level after said temporary increase.

9. A method as claimed in claim 8, wherein said triggering step includes manual operation of a switch.

10. A method as claimed in claim 8, wherein said triggering step includes optically sensing an approach of said connectable circuit unit to a connection location in said connecting step.

11. A method as claimed in claim 8, wherein said triggering step includes sensing connection to a grounding strap to a grounding connection by an installer of said connectable circuit unit.

12. A method as claimed in claim 8, wherein said increase in output voltage is of an amplitude sufficient that any decrease in output voltage during said connecting step does not cause said output voltage to fall below a predetermined lower level.

13. A circuit arrangement, comprising:

an operating voltage source having an input and an output;

a plurality of alternatively connectable and detachable circuit units, each circuit unit having a capacitance and being selectively connectable to the output of the operating voltage source via a supply line;

a control unit having an input and an output, the output of the control unit connected to the input of the operating voltage source; and switch means for outputting a switch signal to the input of the control unit so that said control unit causes an increase in said operating voltage output by said operating voltage source for an imminent connection of at least one of said circuit unit having a capacitor so that the operating voltage output does not drop below a minimum level for a predetermined time interval.

14. The circuit arrangement in claim 13, wherein said switch means is a manually operable switch.

15. The circuit arrangement in claim 13, wherein said switch means is an optical switch.

* * * * *